United States Patent
Milius et al.

(10) Patent No.: US 7,051,327 B1
(45) Date of Patent: May 23, 2006

(54) SYSTEM FOR PROVIDING DATA BACKUP AND RESTORE WITH UPDATED VERSION BY CREATING DATA PACKAGE BASED UPON CONFIGURATION DATA APPLICATION DATA AND USER RESPONSE TO SUGGESTION

(75) Inventors: Daniel C. Milius, Huntington Beach, CA (US); Jeff LaSor, Foothill Ranch, CA (US)

(73) Assignee: Gateway Inc., Irvine, CA (US)

( * ) Notice: Subject to any disclaimer, the term of this patent is extended or adjusted under 35 U.S.C. 154(b) by 467 days.

(21) Appl. No.: 09/850,800

(22) Filed: May 8, 2001

(51) Int. Cl.
*G06F 9/445* (2006.01)
(52) U.S. Cl. .................. 717/177; 717/168; 717/173
(58) Field of Classification Search ............. 709/203, 709/217, 218, 219; 717/177, 168, 173
See application file for complete search history.

(56) References Cited

U.S. PATENT DOCUMENTS 5,005,122 A * 4/1991 Griffin et al. ............... 709/203
5,381,545 A * 1/1995 Baker et al. ................ 714/19

(Continued)

OTHER PUBLICATIONS

ISPs chart new waters. (LAN services) (Industry Trend or Event); Stephanie LaPolla; Oct. 31, 2000, 8:31a.m.; wysiwyg://34/http://access.nerac.com/WN . . . 014BB7C &STITEM=0023&APP=xxx&SCROLL= NEXT.

(Continued)

*Primary Examiner*—Le Hien Luu
(74) *Attorney, Agent, or Firm*—Jeffrey M. Anderson; Suiter West Swantz PC LLO (57) ABSTRACT

The present invention is directed to a system and method for providing a data backup to an information handling system using software updates. The information handling system has one or more applications included thereon and is capable of being communicatively coupled to a remote server through a network connection. A data package is created based upon configuration data and application data stored on the server. The configuration data includes data previously obtained from the information handling system, such as settings and user data. The application data includes data corresponding to the applications included on the information handling system. The data package is formatted into a software update format and transmitted over the network connection to the information handling system. The data package is suitable for restoring the information handling system after failure, and may be utilized by the information handling system as a software update to restore itself.

25 Claims, 9 Drawing Sheets

U.S. PATENT DOCUMENTS

| | | | | |
|---|---|---|---|---|
| 5,499,357 | A | * | 3/1996 | Sonty et al. ............... 710/104 |
| 5,701,457 | A | | 12/1997 | Fujiwara .................. 395/608 |
| 6,014,651 | A | | 1/2000 | Crawford ................. 705/400 |
| 6,049,671 | A | * | 4/2000 | Slivka et al. ............. 717/173 |
| 6,363,359 | B1 | * | 3/2002 | Gronemeyer et al. ....... 705/28 |
| 6,374,289 | B1 | * | 4/2002 | Delaney et al. ........... 709/203 |
| 6,633,977 | B1 | * | 10/2003 | Hamilton et al. .......... 713/100 |
| 2002/0083146 | A1 | * | 6/2002 | Ferguson et al. .......... 709/213 |

OTHER PUBLICATIONS

Enterprise Backup. (Connected Online Backup 3.0)(Brief Article)(Product Announcement); Oct. 31, 2000, 8:23 a.m.; wysiwyg://28/http://access.nerac.com/WN . . . 014BB7C&STITEM=0019&APP=xxx&SCROLL-NEXT.

High speed on-line backup when using logical log operations; D.B. Lomet; Oct. 31, 2000, 8:40 a.m. Wysiwyg://54/http://access.nerac.com/WN . . . 014BB7C&STITEM=0042&APP=xxx&SCROLL=NEXT.

High-availability scheme for shared servers of cluster systems using command transfer; Y. Maya; A. Ohtsuji; Oct. 31, 2000; 8:42 a.m. wysiwyg://56/http://access.nerac.com/WN . . . 014BB7C&STTEM=004&APPxxxx&SCROLL=NEXT Online Data Backup for Personal Computers and Laptops; by @Backup, Inc.; http://www.backup.com.

* cited by examiner

SYSTEM FOR PROVIDING DATA BACKUP AND RESTORE WITH UPDATED VERSION BY CREATING DATA PACKAGE BASED UPON CONFIGURATION DATA APPLICATION DATA AND USER RESPONSE TO SUGGESTION

FIELD OF THE INVENTION

The present invention generally relates to the field of information handling system services, and particularly to, a system and method for providing data backups to information handling systems using software updates.

BACKGROUND OF THE INVENTION

The safe storage of electronic data is of the utmost importance in modern life. With the dependency of people and businesses on electronic data, it is imperative that data is stored accurately and systematically to ensure that the data may be recreated in the event of system failure. However, while most users of information handling systems will acknowledge the importance of data backups, the actual implementation of a data backup system has been difficult to maintain. Some systems require a user to initiate the backup, which is prone to inconsistent results. Other systems, while self initiating, have the data stored locally, so that the data may be susceptible to loss with the original set of data should the premises suffer a catastrophe, such as a fire, flood, storm and the like.

Additionally, users of information handling systems typically utilize applications to perform a variety of functions. Since most applications are in the process of constant improvement and modification to provide additional functions, updates to the applications are needed to utilize this increased functionality. However, there may be instances in which the updated application is incompatible with applications and data on a user's information handling system. Therefore, the provision of the updated application may result in problems for the information handling system with other applications and data, thereby resulting in decreased rather than increased functionality.

Therefore, it would be desirable to provide a system and method for providing data backups to an information handling system using software updates.

SUMMARY OF THE INVENTION

Accordingly, the present invention is directed to a system and method for providing data backups to an information handling system using software updates. In a first aspect of the present invention, a method of providing a data backup for an information handling system is disclosed, in which the information handling system has one or more applications included thereon and is capable of being communicatively coupled to a remote server through a network connection. A software update system residing on the server creates a data package based upon configuration data and application data stored on the server. The configuration data includes data previously obtained from the information handling system, such as settings, user data, and the like (e.g., desktop settings, application settings, documents, spreadsheets, other data produced using applications, and the like). The application data includes data corresponding to the applications included on the information handling system. The data package is then formatted into a software update format and transmitted over the network to the information handling system. The data package is suitable for restoring the information handling system after failure, and may be utilized by the information handling system as a software update to restore itself after such failure. Alternatively, the data package may be utilized for transferring configuration data and application data from one information handling system to another information handling system.

In a second aspect of the present invention, a method of obtaining a data backup for the information handling system includes querying the information handling system for data about the applications included thereon. Next, it is determined if each application included on the information handling system is available on the remote server. If the application is available, an identifier is stored, which indicates the application and enables retrieval of the application from the server. If the application is not available, the application itself is copied from the information handling system and stored on the remote server.

In a third aspect of the present invention, an updated version of at least one of the applications included on the information handling system may be provided by the software update system residing on the server to the information handling system. The updated version of the application may be verified for compatibility with hardware for the information handling system, as well as with the configuration data and the other applications included on the information handling system, prior to including the updated version of the application in the application data.

In this way, the present invention provides a system and a method for providing data backups to an information handling system by leveraging a software update system, and thus, provides increased functionality and services to a user of the information handling system.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 9, exemplary embodiments of the present invention are shown. The safe storage of data is becoming increasingly more important in the modern economy. Further, the amount of information that needs to be reliably stored has increased dramatically as companies and people rely more and more on electronic data, applications, and the like, in their lives. Therefore, persistent storage of data is of the utmost importance.

Figure 1:
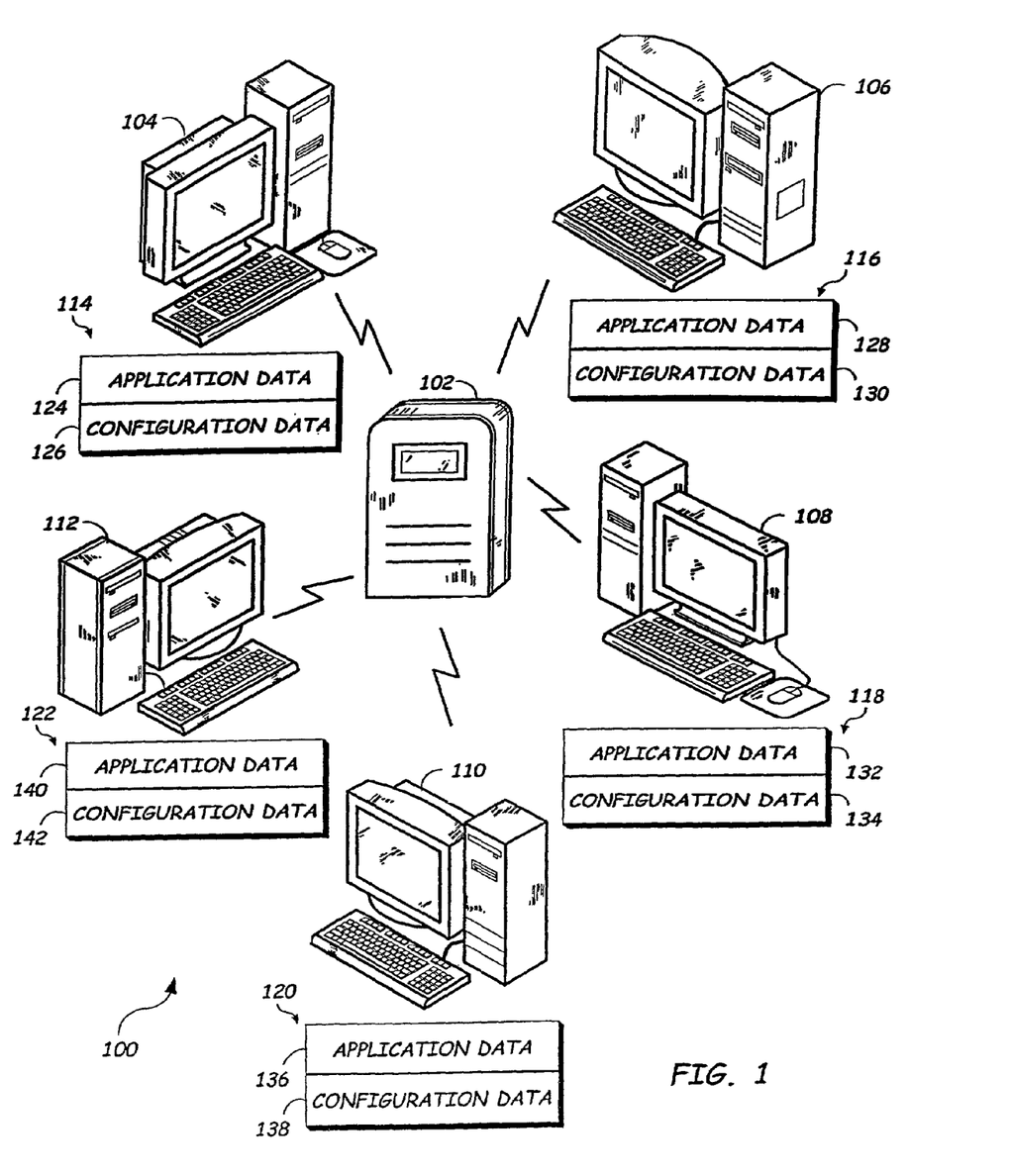
FIG. 1 is an illustration of an exemplary embodiment of the present invention wherein a server is accessible over a network to a plurality of information handling systems to provide a persistent backup in a space efficient manner.

Referring now to FIG. 1, an exemplary embodiment 100 of the present invention is shown wherein a server 102 is accessible over a network connection to a plurality of information handling systems 104, 106, 108, 110, & 112 to provide a persistent backup in a space efficient manner. Information handling systems 104, 106, 108, 110, & 112 may include typical desktop computers, mobile computers, personal digital assistants, convergence systems, digital information appliances, Internet appliances and the like as contemplated by a person of ordinary skill in the art. In this instance, each information handling system 104, 106, 108, 110, or 112 includes data 114, 116, 118, 120, or 122 stored on the information handling system for backup.

For instance, data 114, 116, 118 120 & 122 may include application data 124, 128, 132, 136 & 140 and configuration data 126, 130, 134, 138 & 142. Application data 124, 128, 132, 136 & 140 may include software programs, such as operating systems, word processors, and the like, utilized to perform a function on the information handling systems 104, 106, 108, 110, & 112. Configuration data 126, 130, 134, 138 & 142 may include user-produced data and settings data that are specific to set-up and configuration of the information handling systems 104, 106, 108, 110, & 112 for a user, such as desktop settings, documents, spreadsheets, and the like. As may be seen in the exemplary embodiment 100 shown in FIG. 1, even with only five information handling systems 104, 106, 108, 110 & 112, the amount of data to be backed up may be significant. Further, the time and impetus needed to initiate a backup by a user of the information handling system 104, 106, 108, 110, or 112, while generally good intentioned, may have difficulty in practice. For example, a user may desire to backup data on the information handling system 104, 106, 108, 110, or 112 once a week, but in actuality, may only do so once a month. Therefore, by leveraging a software update system residing on the server 102, periodic backups and updates of the information handling system 104, 106, 108, 110, or 112 may be performed in an efficient and timely manner.

Figure 2:
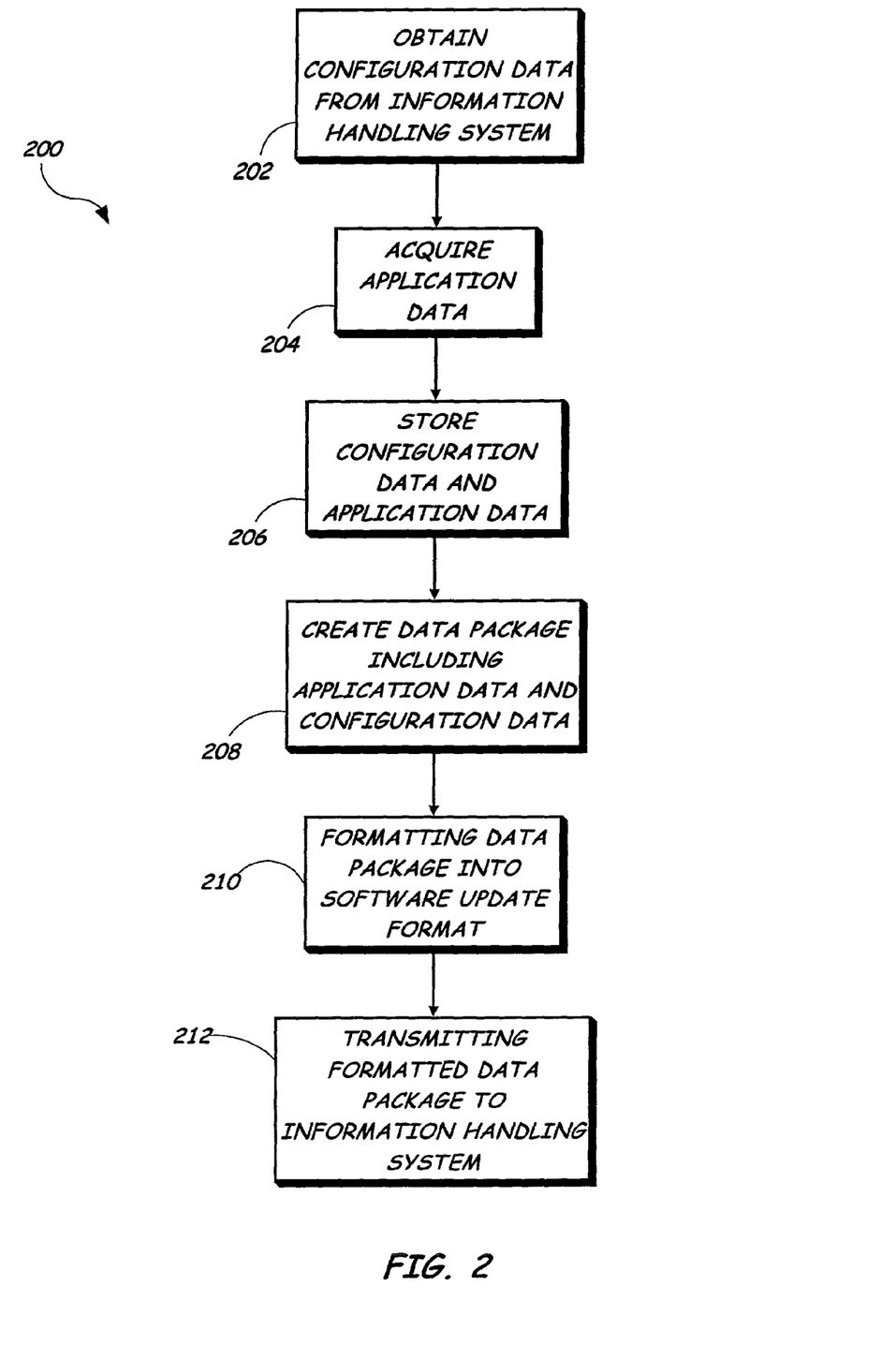
FIG. 2 is a flow diagram depicting an exemplary method of the present invention wherein a software update system is leveraged to provide a data backup for an information handling system over a network.

Referring now to FIG. 2, an exemplary method 200 of the present invention is shown wherein a software update system is leveraged to provide a data backup for an information handling system over a network connection. A software update system may be utilized by an information handling system to acquire software updates to applications included on the information handling system. For example, a program on an information handling system may access a network and thereafter a web site to obtain an update to an application. An update is provided from the web site to the information handling system and utilized to update the application. However, the update process may also be utilized to provide a data backup for the information handling system.

For example, while a user's information handling system is utilized to access a web site including software updates, data may be received from the information handling system by the web site, specifically a server or group of servers utilized to provide the web site, and used to provide a data backup for the information handling system. A software agent residing on the information handling system creates a data package including the data to be backed-up by the web site, and then transmits this data package to the web site. The data package transmitted to the web site may include application data and configuration data, so that in the case of failure, the information handling system may be restored. Alternatively, the data package may be utilized for transferring configuration data and application data from one information handling system to another information handling system. In step 202, configuration data is obtained from the information handling system, such as settings for a particular application to be updated by the web site, data produced by the application, as well as other configuration data contemplated by a person of ordinary skill in the art. Application data is also acquired from the information handling system in step 204. The application data may correspond to the application to be updated by the web site, such as the version and type of the application, as well as other applications included on the information handling system. The configuration data and the application data are obtained by the software agent residing on the information handling system and transmitted to the web site or remote server. The configuration data and application data are then stored in step 206, for example, on a storage device, such as the remote server or the like.

Therefore, if the information handling system suffers a failure that requires the data to be reconstructed, or alternatively, if the data is to be transferred from one information handling system to another information handling system, a data package is created in step 208. The data package may include application data and configuration data, which were obtained based on the previously stored data and are suitable for restoring the information handling system. The data package is then formatted into a software update format in step 210. The software update format is defined by the software update system residing on the server and may be utilized by the user's information handling system to install and/or update software on the information handling system. In step 212, the formatted data package is transmitted to the information handling system over a network connection, which may include a local area network (LAN), wide area network (WAN), the Internet, and the like, as well as a Universal Serial Bus (USB) connection, a Recommended Standard 232 (RS-232) connection, or other type of connection to a remote device. The information handling system then utilizes the software update package to provide data suitable for restoring the information handling system. In this way, the software update system residing on the server may be leveraged to include a data backup utility to provide increased functionality and services to a user.

Figure 3:
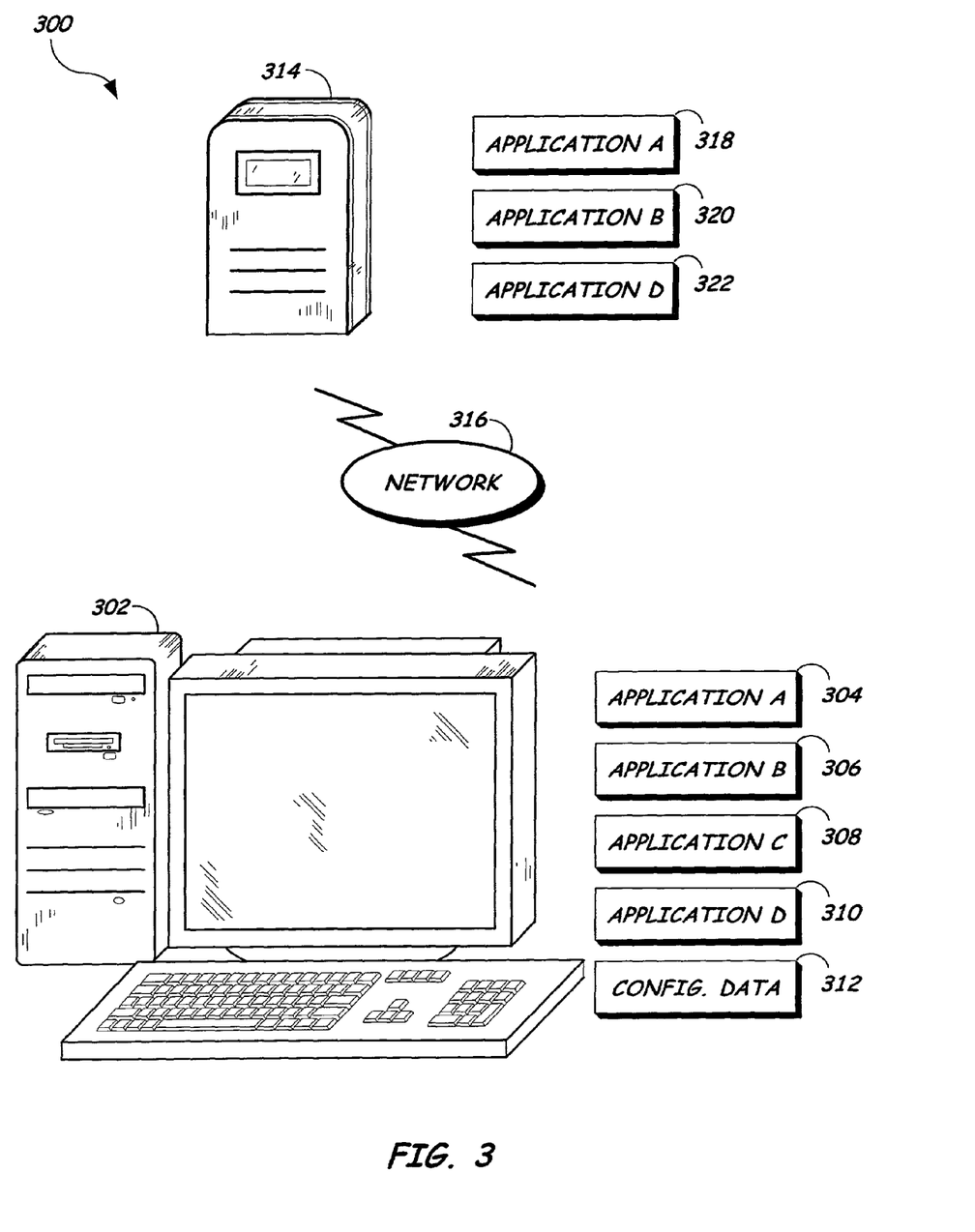
FIG. 3 is an illustration of an exemplary embodiment of the present invention wherein data is backed-up in a storage space efficient manner.

Referring now to FIG. 3, an exemplary embodiment 300 of the present invention is shown wherein data is backed-up in a storage space efficient manner. An information handling system 302 may include a plurality of applications and configuration data, such as application A 304, application B 306, application C 308, application D 310 and configuration data 312. A software update system resides on a server 314 communicatively coupled to the information handling system 302 over a network connection 316, and has access to application A 318, application B 320 and application D 322. For example, application A 318, application B 320, and application D 322 may be stored on the server 314, or alternatively, may be available to the server 314 from a remote repository.

To save storage space on the backup server 314, an identifier may be stored corresponding to applications accessible by the software update system on the server 314 that correspond to applications included on the information handling system 302. For example, an identifier may be stored by the software update system indicating that application A 304, application B 306, and application D 310 included on the information handling system 302 correspond to application A 318, application B 320, and application D 322 accessible by the software update system on the server 314. Thus, if creation of a data package is needed to restore the information handling system 302, the identifier may be used to retrieve the applications accessible by the software update system corresponding to the applications on the information handling system 302. Additionally, applications not available to the software update system residing on the server 314, such as application C 308, as well as the configuration data 312, may be copied from the information handling system 302 and stored in their entirety on the server 314. In this way, storage space available to the server 314 may be efficiently utilized by not including duplicate applications and data in storage to provide a backup. However, in alternative embodiments, this mechanism for efficiently utilizing storage space on the server 314 may be omitted, and all applications and configuration data stored on the information handling system 302 may be copied therefrom and stored on the server 314. Further, although a server 314 is described, it should be apparent that a variety of configurations and groupings of equipment suitable for performing the functions described are contemplated by the present invention without departing from the spirit and scope thereof.

Figure 4:
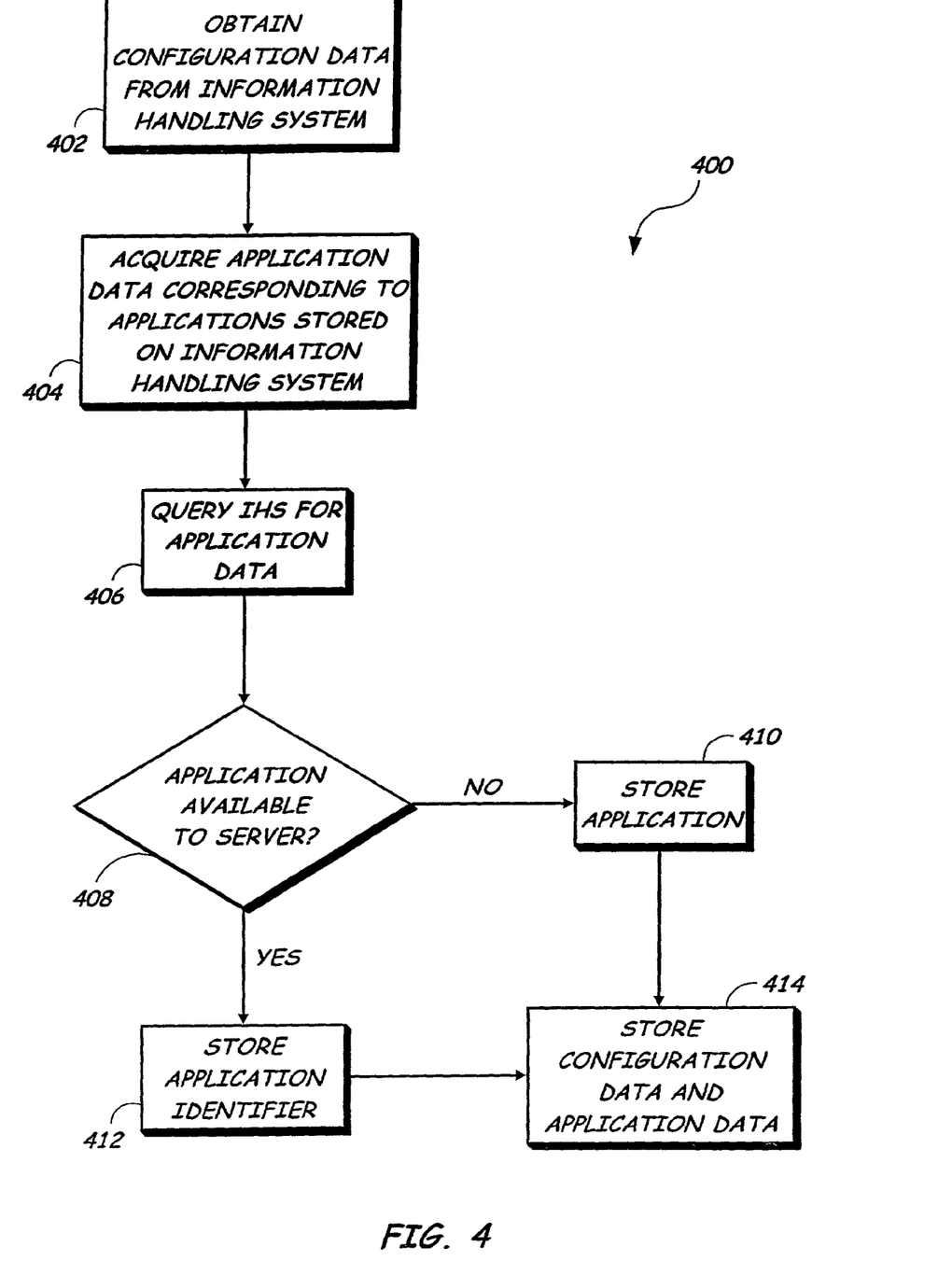
FIG. 4 is a flow diagram depicting an exemplary method of the present invention wherein application data including an application identifier is stored so as to enable restoration data to be provided in an efficient manner.

Referring now to FIG. 4, an exemplary method 400 of the present invention is shown wherein application data including an application identifier is stored so as to enable restoration data to be provided in an efficient manner. Configuration data is obtained from an information handling system in step 402. In step 404, application data is acquired from the information handling system, which corresponds to applications stored on the information handling system. The configuration data and the application data are obtained by the software agent residing on the information handling system and transmitted to the software update system residing on the server. In step 406, the information handling system may be queried for application data, for example, if a certain application is available to the software update system in step 408. If the application is not available, the application is copied from the information handling system and stored by the software update system on the server in step 410. However, if the application is available, an application identifier is stored in place of the application at step 412. Therefore, storage space may be saved on the server when the configuration data and application data are stored in step 414.

Figure 5:
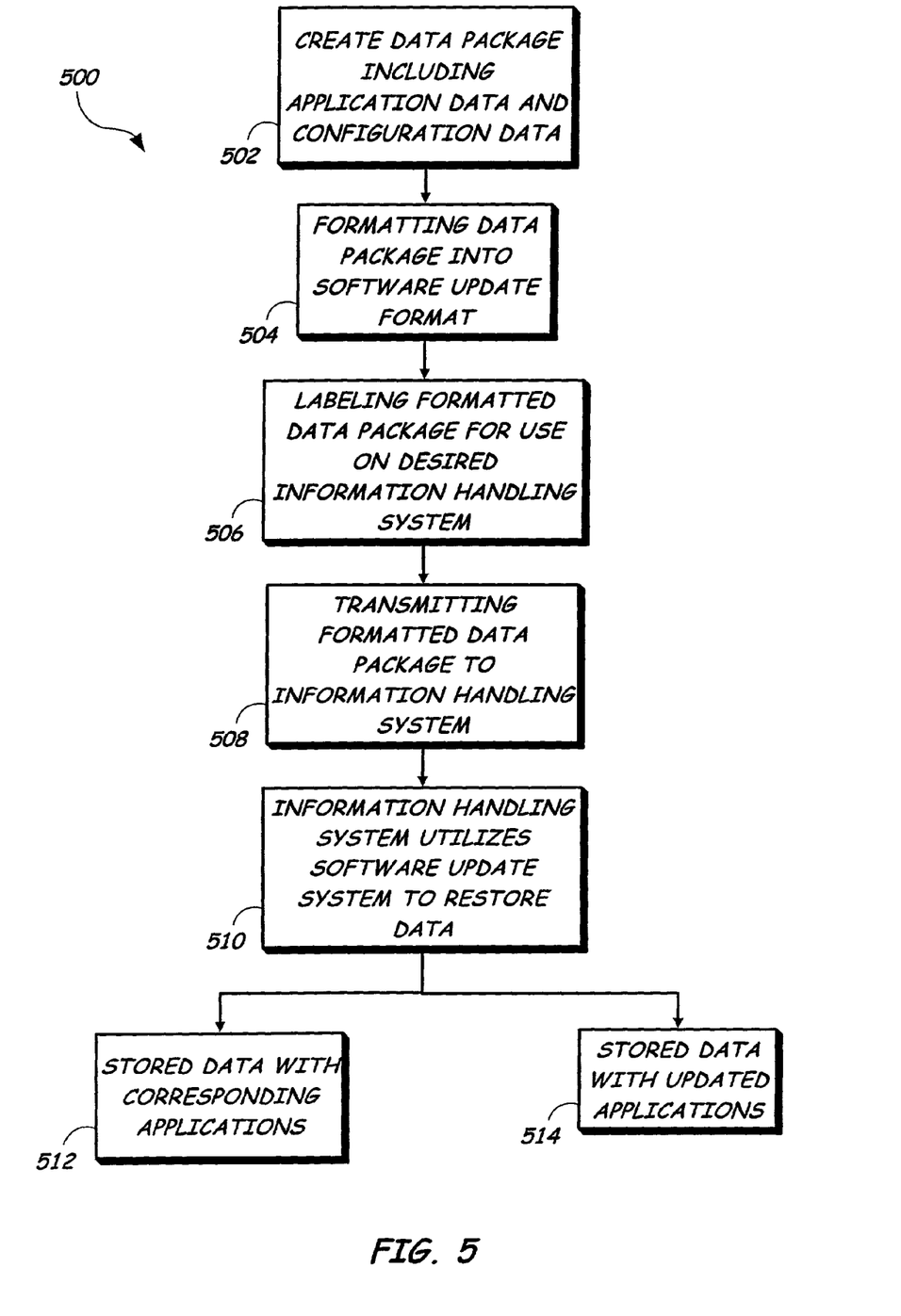
FIG. 5 is a flow diagram illustrating an exemplary method of the present invention wherein a software update system is utilized to provide a data backup for an information handling system.

Referring now to FIG. 5, an exemplary embodiment 500 of the present invention is shown wherein a software update system residing on a server is utilized to provide a data backup for an information handling system. In step 502, a data package is created including application data and configuration data suitable for restoring an information handling system. In step 504, the application data and configuration data are formatted into a software update format suitable for being utilized in the manner of a software update to restore data on the information handling system. The formatted data package is labeled for use on a desired information handling system in step 506. For example, a plurality of data packages may be created to restore information handling systems; therefore, it may be preferable to label the data package for a corresponding information handling system. Other mechanisms for associating the formatted data package with a corresponding information handling system may also be used, such as a certificate, digital signature, and the like.

In step 508, the formatted data package is transmitted from the server to the information handling system, and in step 510, the information handling system utilizes the formatted data package as a software update to restore data on the information handling system. For example, the formatted data package may be designed as an executable, which may perform functions targeted toward installing and/or updating software on the information handling system. Additionally, the data package may include stored configuration data with corresponding applications which is utilized in step 512, and may also include updated applications corresponding to applications included previously on the information handling system which is utilized in step 514, to provide a complete update and system restore at once. By formatting the data package as a software update, the software update system residing on the server may be leveraged to restore data on the information handling system. Alternatively, the software update system residing on the server may be utilized to transfer data from one information handling system to another information handling system.

Figure 6:
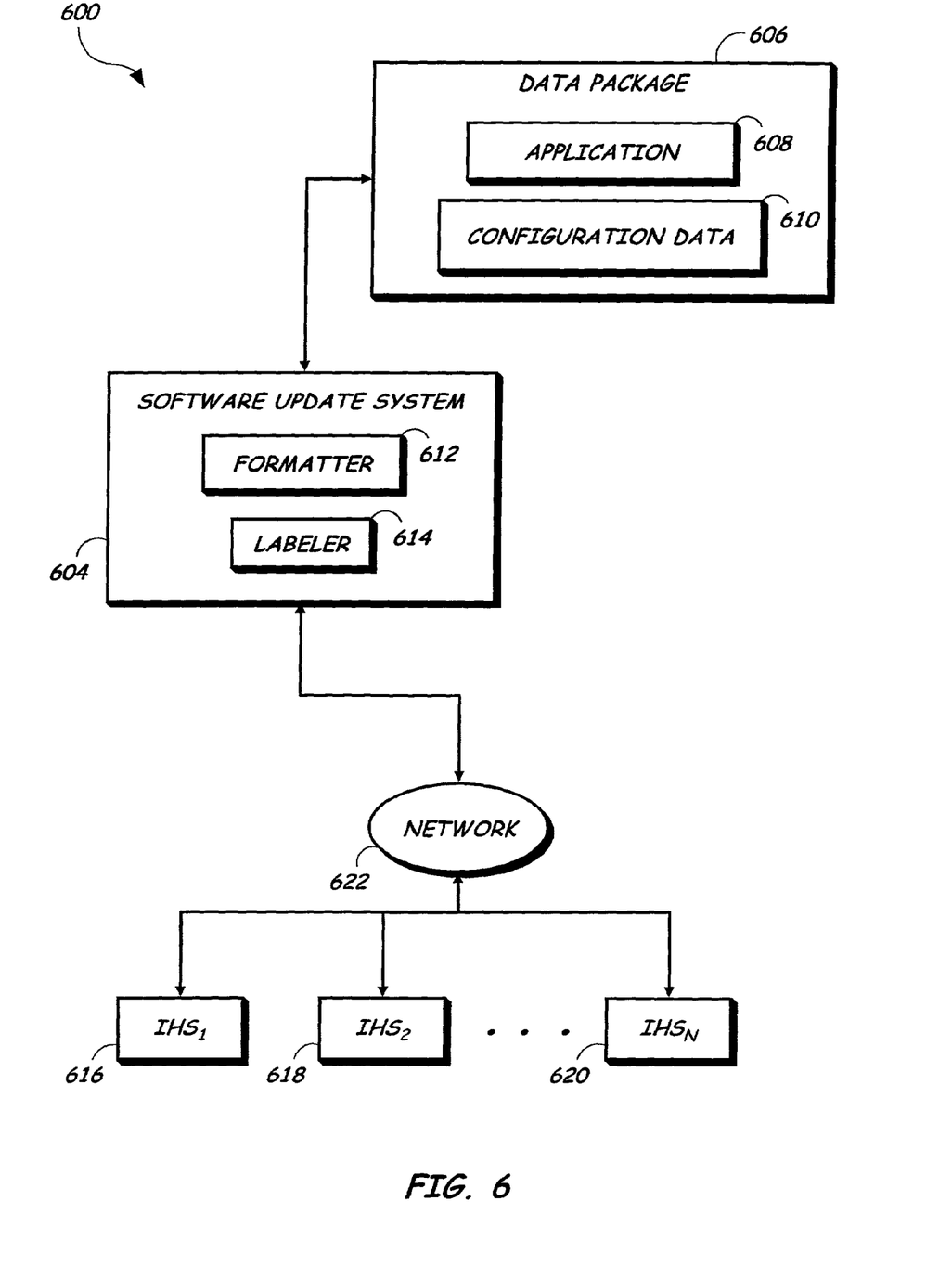
FIG. 6 is a diagrammatic block diagram illustrating an exemplary embodiment of the present invention wherein a software update system is utilized to update and restore an information handling system.

For example, referring now to FIG. 6, an exemplary embodiment 600 of the present invention is shown wherein a software update system is utilized to update and restore an information handling system. A software update system 604 resides on a server, group of servers, and the like. The software update system 604 is suitable for creating a data package 606 capable of restoring data on the information handling system 616, 618, or 620 after a hard drive failure, virus, general data loss, and the like. Alternatively, the data package 606 may be utilized to transfer data from one information handling system 616, 618, or 620 to another information handling system 616, 618, or 620. The data package 606 includes application data 608 (such as stored applications and applications retrieved based on stored application identifiers) and configuration data 610 (such as user settings, documents, and other user specific information).

The software update system 604 includes a formatter 612 to format the data package 606 into a software update format, which may then be utilized by the information handling system 616, 618, or 620 as a software update to restore data on the information handling system 616, 618, or 620. A labeler 614 may also be included to identify the data package 606 for the particular information handling system 616, 618, or 620. Therefore, if a software update system 604 were to provide multiple data packages 606 to a plurality of information handling systems 616, 618 & 620 over a network 622, each data package 606 may be sent to the corresponding information handling system 616, 618, or 620.

Figure 7:
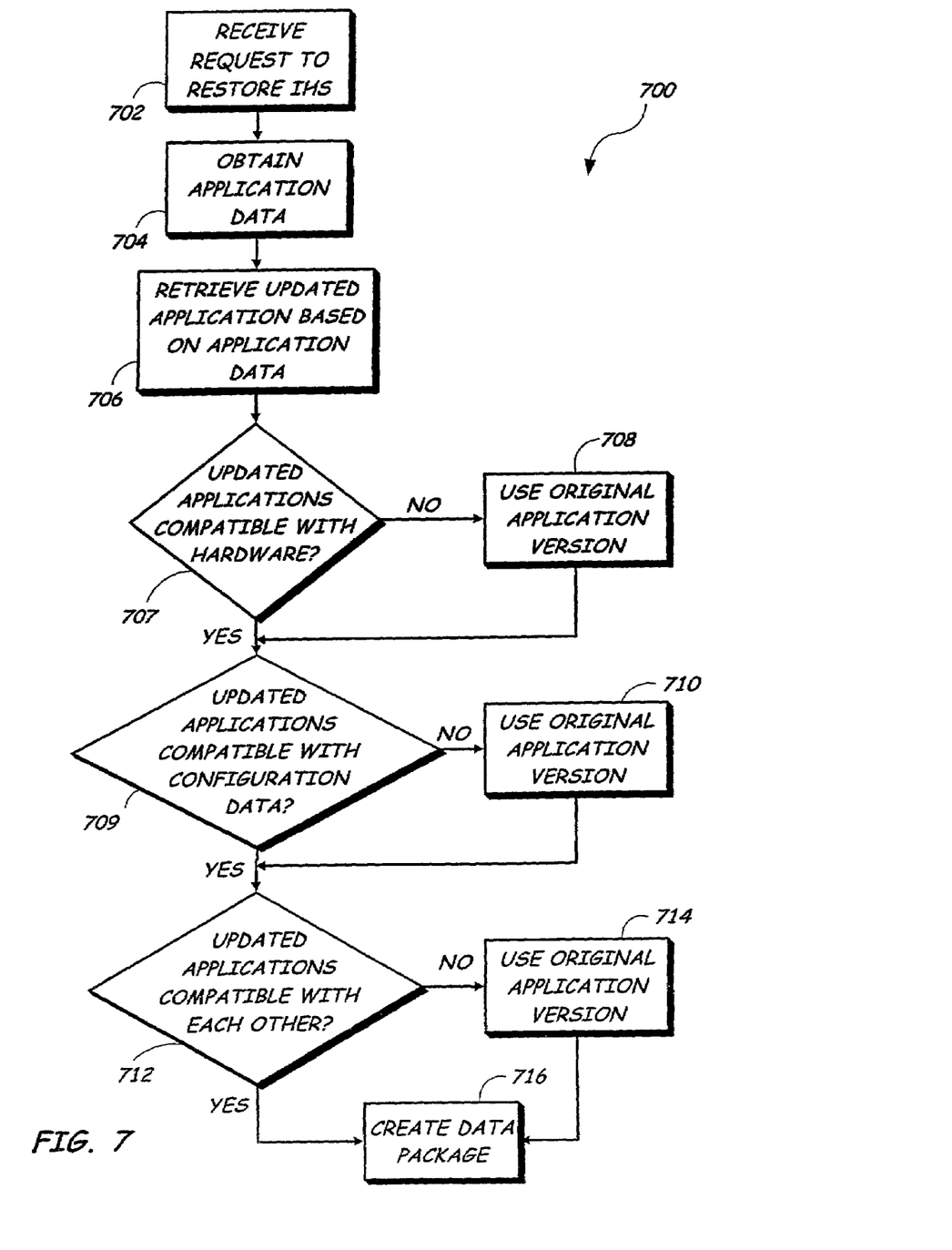
FIG. 7 is a flow diagram depicting an exemplary method of the present invention wherein updated applications corresponding to applications included on an information handling system are checked for compatibility.

Referring now to FIG. 7, an exemplary embodiment 700 of the present invention is shown wherein updated applications corresponding to applications included on an information handling system are checked for compatibility. The provision of updated applications may provide a user with increased functionality. However, these updated applications may not be compatible with other applications and data included on a user's information handling system. Therefore, if compatibility of the updated application was verified, problems associated with incompatible programs and data may be eliminated.

In step 702, a request to restore an information handling system may be received, in which the information handling system is to receive updated applications. In step 704, application data is obtained by a software agent residing on the information handling system and transmitted to a software update system residing on a server. The application data indicates applications included on the information handling system. In step 706, an updated application is retrieved by the software update system, corresponding to an application included on the information handling system as indicated by the application data. Next, in step 707, the updated application is checked for compatibility with hardware for the information handling system. If the updated application is not compatible with the hardware for the information handling system, the original application version is provided in step 708. If the updated application is compatible with the hardware for the information handling system, then in step 709, the updated application is also checked for compatibility with configuration data, such as user settings, specific user system data, documents, data, and the like. Compatibility may be tested utilizing a variety of methods, such as through a compatibility list containing a listing of compatible applications and data, actual testing of the applications in operation, and the like as contemplated by a person of ordinary skill in the art. If the configuration data and the updated application are not compatible, the original application version is provided in step 710. Additionally, if the configuration data and the updated application are compatible, the updated application may be tested for compatibility with other applications to be included on the information handling system in step 712. Again, if the updated application is not compatible with the other applications, the original application version may be utilized in step 714. In this way, a data package may be created in step 716 which includes updated applications that are compatible with both other applications and configuration data to be included on the targeted information handling system. Although a compatibility test is discussed in which compatibility is tested after retrieval of the application, it should be apparent to a person of ordinary skill in the art that compatibility may be tested before retrieval of the updated application without departing from the spirit and scope of the present invention.

Figure 8A:
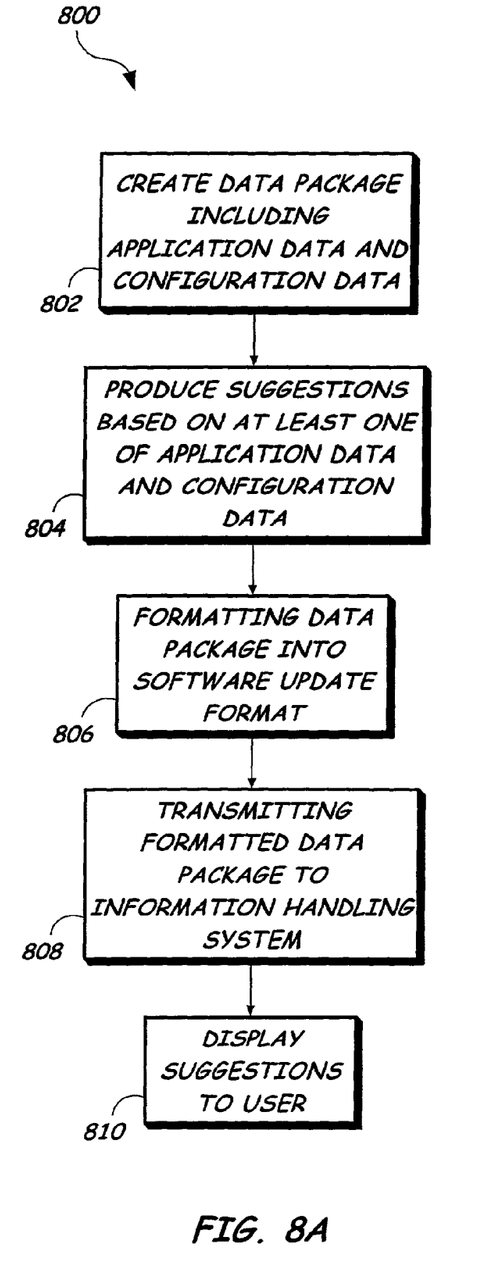
FIG. 8A is a flow diagram illustrating an exemplary method of the present invention wherein a suggestion is provided based upon application data and configuration data obtained from an information handling system.
Figure 8B:
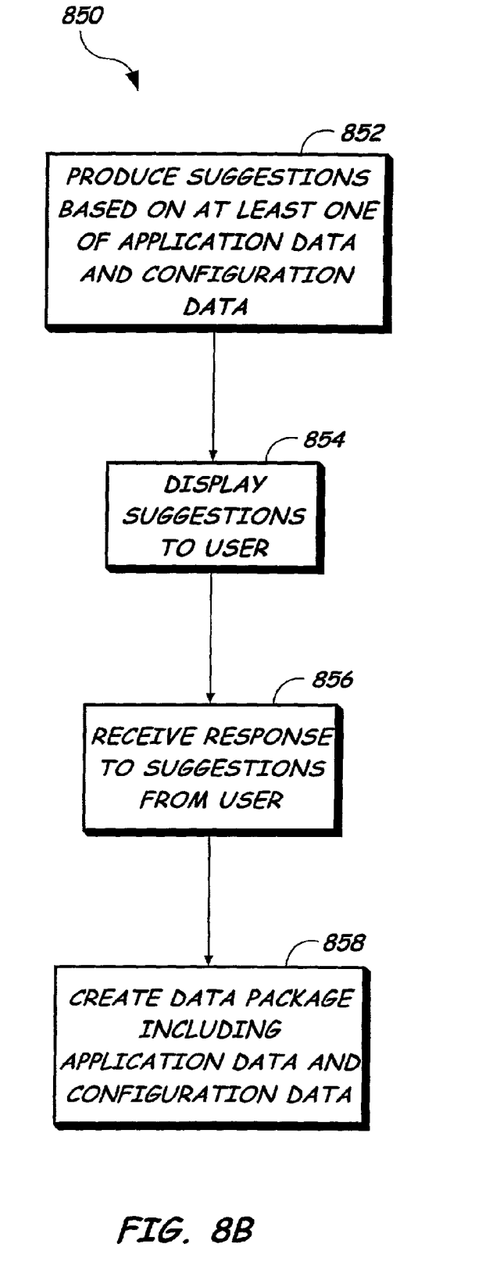
FIG. 8B is a flow diagram illustrating an exemplary method of the present invention wherein a suggestion is provided based upon application data and configuration data obtained from an information handling system.

Referring now to FIGS. 8A and 8B, exemplary embodiments 800 & 850 of the present invention are shown in which suggestions are provided based upon application data and configuration data obtained from an information handling system. A data package is created including application data and configuration data in step 802. Suggestions are also produced based on at least one of the application data and configuration data in step 804. For example, suggestions may be included to suggest an updated application to replace existing applications, structuring of the data to be included on the user's information handling system, new hardware that may be desirable on the user's information handling system, settings, and the like as contemplated by a person of ordinary skill in the art. The data package, including the suggestions, are formatted into a software update format in step 806. The formatted data package is then transmitted to the information handling system in step 808, after which the suggestions are displayed to a user of the information handling system in step 810.

Suggestions may also be provided to a user before a data package is transmitted. Suggestions may be produced based on at least one of application data and configuration data previously obtained from an information handling system in step 852. For example, suggestions may be made to include updated versions of applications in a data package, new hardware or software that may be desirable on the user's information handling system, and the like as contemplated by a person of ordinary skill in the art. The suggestions are displayed to the user in step 854, and a response is received from the user based on the suggestions in step 856. Thus, a data package may be created in step 858, including application data and configuration data formatted based on the user's response to the suggestions, such as to include an updated application, additional application, new user settings, and the like.

Figure 9:
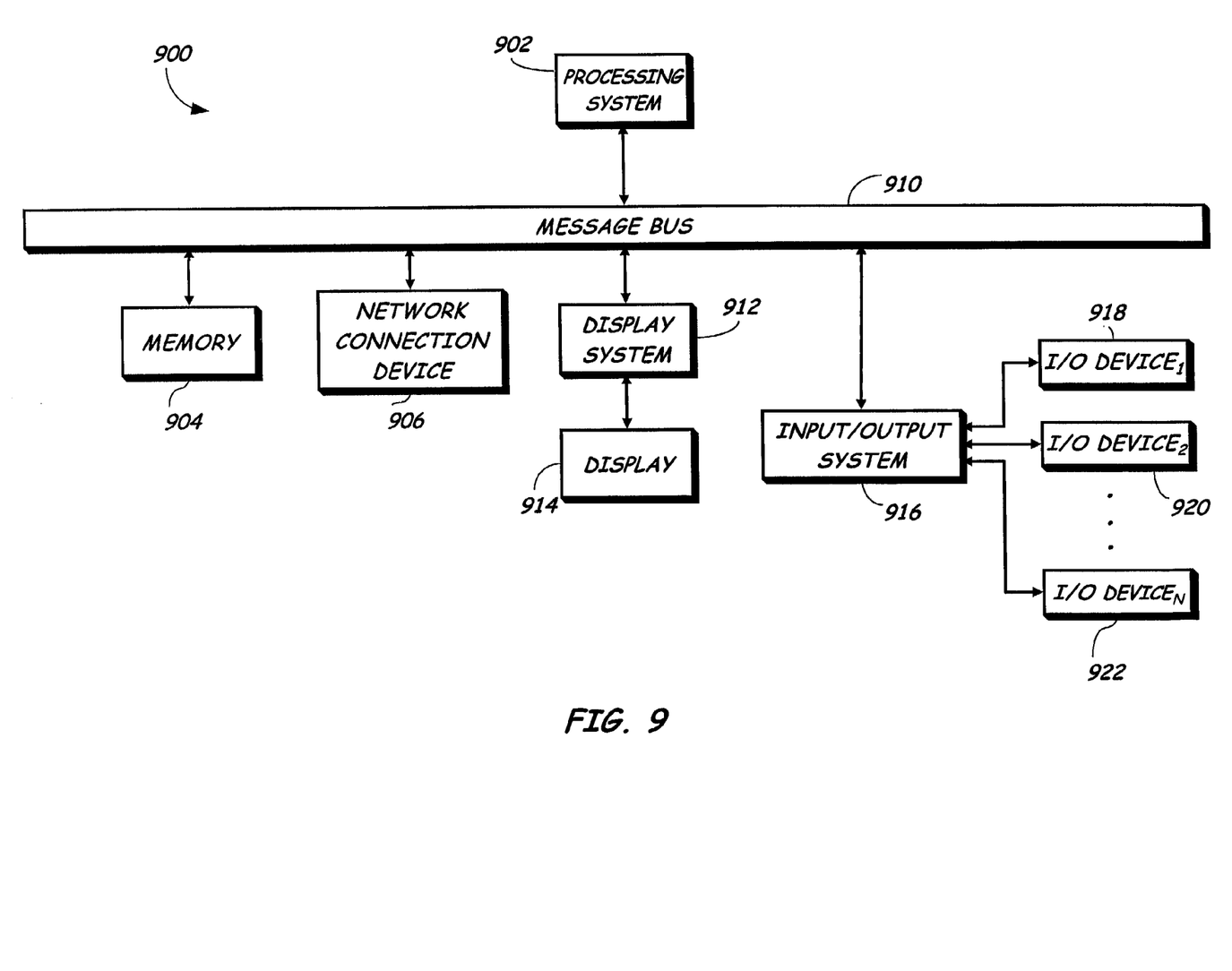
FIG. 9 is a block diagram illustrating an exemplary information handling system operable to employ the present invention.

Referring now to FIG. 9, a hardware system in accordance with the present invention is shown. The hardware system shown in FIG. 9 is generally representative of the hardware architecture of an information handling system 900 of the present invention. A controller, for example, a processing system 902, controls the information handling system 900. The processing system 902 includes a central processing unit such as a microprocessor or microcontroller for executing programs, performing data manipulations and controlling the tasks of the information handling system 900. Communication with the processing system 902 may be implemented through a system bus 910 for transferring information among the components of the information handling system 900. The system bus 910 may include a data channel for facilitating information transfer between storage and other peripheral components of the information handling system 900. The system bus 910 further provides the set of signals required for communication with processing system 902 including a data bus, address bus, and control bus. The system bus 910 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-600, and so on. Furthermore, the system bus 910 may be compliant with any promulgated industry standard for bus architectures, for example, Industry Standard Architecture (ISA), Extended Industry Standard Architecture (EISA), Micro Channel Architecture, Peripheral Component Interconnect (PCI), Universal Serial Bus (USB), Access bus, IEEE P6394, Apple Desktop Bus (ADB), Concentration Highway Interface (CHI), Fire Wire, Geo Port, or Small Computer Systems Interface (SCSI).

Additionally, the information handling system 900 includes a memory 904. In one embodiment, memory 904 is provided on SIMMs (Single In-line Memory Modules), while in another embodiment, memory 904 is provided on DIMMs (Dual In-line Memory Modules), each of which plugs into suitable sockets provided on a motherboard holding many of the other components shown in FIG. 9. Memory 904 includes standard DRAM (Dynamic Random-Access Memory), EDO (Extended Data Out) DRAM, SDRAM (Synchronous DRAM), or other suitable memory technology. Memory 904 may also include auxiliary memory to provide storage of instructions and data that are loaded into the memory 904 before execution. Auxiliary memory may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM).

The information handling system 900 further includes a network connection device 906. The network connection device 906 communicates between the information handling system 900 and a remote device, such as external devices, networks, information sources, or host systems that administer a plurality of information handling systems. For example, host systems, such as a server or information handling system, may run software controlling the information handling system, serve as storage for an information handling system, or coordinate software running separately on each information handling system. The network connection device 906 may provide or receive analog, digital, or radio frequency data. The network connection device 906 preferably implements industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.66 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Universal Serial Bus (USB), and so on. For example, the network connection device 906 may comprise a network adapter, a serial port, parallel port, printer adapter, modem, universal asynchronous receiver-transmitter (UART) port, and the like, or use various wireless technologies or links such as an infrared port, radio-frequency (RF) communications adapter, infrared transducers, or RF modem.

The information handling system 900 further includes a display system 912 for connecting to a display device 914. The display system 912 may comprise a video display adapter having all of the components for driving the display device, including video random access memory (VRAM), buffer, and graphics engine as desired. The display device 914 may comprise a liquid-crystal display (LCD), or may comprise alternative type of display technologies, such as a light-emitting diode (LED) display, gas or plasma display, or employ flat-screen technology.

An information handling system 900 may further include an input/output (I/O) system 916 for connecting to one or more I/O devices 918, 920, and up to N number of I/O devices 922. Input/output system 916 may comprise one or more controllers or adapters for providing interface functions between one or more of I/O devices 918–922. For example, input/output system 916 may comprise a serial port, parallel port, network adapter, printer adapter, radio-frequency (RF) communications adapter, universal asynchronous receiver-transmitter (UART) port, and the like, for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, and the like. It should be appreciated that modification or reconfiguration of the information handling system 900 of FIG. 9 by one having ordinary skill in the art would not depart from the scope or the spirit of the present invention.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory 904 of one or more information handling systems configured generally as described in FIG. 9. Until required by the information handling system, the set of instructions may be stored in another readable memory device, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of an information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the system and method of providing software updates and data backups of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described is merely an explanatory embodiment thereof. It is the intention of the following claims to encompass and include such changes.

What is claimed is:

1. A method of providing a data backup for an information handling system, the information handling system having one or more applications included thereon and capable of being communicatively coupled over a network connection to a remote server, and the server having one or more applications available thereon, comprising:

creating a data package based upon configuration data and application data stored on the server, the configuration data including settings and user data previously obtained from the information handling system and the application data including data corresponding to the applications included on the information handling system, the application data further including an updated version of one of the applications included on the information handling system;

based upon at least one of the application data and the configuration data stored on the server, producing a suggestion for at least one of: an application to be installed on the information handling system, hardware for the information handling system, and a configuration setting for the information handling system;

displaying the produced suggestion on the information handling system;

receiving a response to the displayed suggestion;

further creating the data package based upon the response to the displayed suggestion;

formatting the data package into a software update format;

labeling the data package to indicate the information handling system for which the data package was created; and, transmitting the data package over the network connection to the information handling system, the data package being suitable for restoring the information handling system.

2. The method as described in claim 1, wherein the network connection includes at least one of: a local area network (LAN), a wide area network (WAN), the Internet, a Universal Serial Bus (USB) connection, and a Recommended Standard 232 (RS-232) connection.

3. The method as described in claim 1, further comprising: querying the information handling system whether each application included thereon is available on the server.

4. The method as described in claim 3, wherein if a respective application included on the information handling system is available on the server, the application data further includes an identifier indicating the respective application and enabling retrieval of the respective application from the server.

5. The method as described in claim 3, wherein if a respective application included on the information handling system is not available on the server, the application data further includes the respective application.

6. The method as described in claim 1, further comprising: verifying compatibility of the updated version of the application with hardware for the information handling system.

7. The method as described in claim 1, further comprising: verifying compatibility of the updated version of the application with the configuration data.

8. The method as described in claim 1, further comprising: verifying compatibility of the updated version of the application with another one of the applications included on the information handling system.

9. The method as described in claim 1, further comprising:
including the produced suggestion in the data package; and displaying the produced suggestion on the information handling system after transmitting the formatted data package thereto.

10. A storage medium readable by a computing device and having instructions encoded thereon for causing the computing device to perform a method of providing a data backup for an information handling system, the information handling system having one or more applications included thereon and capable of being communicatively coupled over a network connection to a remote server, and the server having one or more applications available thereon, the method comprising the steps of:

creating a data package based upon configuration data and application data stored on the server, the configuration data including settings and user data previously obtained from the information handling system and the application data including data corresponding to the applications included on the information handling system, the application data further including an updated version of one of the applications included on the information handling system;

based upon at least one of the application data and the configuration data stored on the server, producing a suggestion for at least one of: an application to be installed on the information handling system, hardware for the information handling system, and a configuration setting for the information handling system;

displaying the produced suggestion on the information handling system;

receiving a response to the displayed suggestion;

further creating the data package based upon the response to the displayed suggestion;

formatting the data package into a software update format;

labeling the data package to indicate the information handling system for which the data package was created; and, transmitting the data package over the network connection to the information handling system, the data package being suitable for restoring the information handling system.

11. A method of obtaining a data backup for an information handling system, the information handling system having one or more applications included thereon and capable of being communicatively coupled over a network connection to a remote server, and the server having one or more applications available thereon and application data stored thereon corresponding to the applications included on the information handling system, comprising:

querying the information handling system for data about the applications included thereon;

determining if each application included on the information handling system is available on the server;

if a respective application included on the information handling system is available on the server, storing an identifier as the application data, the identifier indicating the respective application and enabling retrieval of the respective application from the server;

if a respective application is not available on the server, storing the respective application as the application data;

creating a data package based upon the application data stored on the server, the application data including an updated version of one of the applications included on the information handling system, the data package being further created based upon configuration data stored on the server, the configuration data including settings and user data previously obtained from the information handling system;

based upon at least one of the application data and the configuration data stored on the server, producing a suggestion for at least one of: an application to be installed on the information handling system, hardware for the information handling system, and a configuration setting for the information handling system;

displaying the produced suggestion on the information handling system;

receiving a response to the displayed suggestion;

further creating the data package based upon the response to the displayed suggestion;

formatting the data package into a software update format;

labeling the data package to indicate the information handling system for which the data package was created; and, transmitting the data package over the network connection to the information handling system, the data package being suitable for restoring the information handling system.

12. The method as described in claim 11, wherein the network connection includes at least one of a local area network (LAN), a wide area network (WAN), the Internet, a Universal Serial Bus (USB) connection, and a Recommended Standard 232 (RS-232) connection.

13. The method as described in claim 11, further comprising: verifying compatibility of the updated version of the application with hardware for the information handling system.

14. The method as described in claim 11, further comprising: verifying compatibility of the updated version of the application with the configuration data.

15. The method as described in claim 11, further comprising: verifying compatibility of the updated version of the application with another one of the applications included on the information handling system.

16. The method as described in claim 11, further comprising: including the produced suggestion in the data package; and displaying the produced suggestion on the information handling system after transmitting the data package thereto.

17. A storage medium readable by a computing device and having instructions encoded thereon for causing the computing device to perform a method of obtaining a data backup for an information handling system, the information handling system having one or more applications included thereon and capable of being communicatively coupled over a network connection to a remote server, and the server having one or more applications available thereon and application data stored thereon corresponding to the applications included on the information handling system, the method comprising the steps of:

querying the information handling system for data about the applications included thereon;

determining if each application included on the information handling system is available on the server;

if a respective application included on the information handling system is available on the server, storing an identifier as the application data, the identifier indicating the respective application and enabling retrieval of the respective application from the server;

if a respective application is not available on the server, storing the respective application as the application data;

creating a data package based upon the application data stored on the server, the application data including an updated version of one of the applications included on the information handling system;

based upon at least one of the application data and the configuration data stored on the server, producing a suggestion for at least one of: an application to be installed on the information handling system, hardware for the information handling system, and a configuration setting for the information handling system;

displaying the produced suggestion on the information handling system;

receiving a response to the displayed suggestion;

further creating the data package based upon the response to the displayed suggestion;

formatting the data package into a software update format;

labeling the data package to indicate the information handling system for which the data package was created; and, transmitting the data package over the network connection to the information handling system, the data package being suitable for restoring the information handling system.

18. A system for providing a data backup to an information handling system, the information handling system having one or more applications included thereon and capable of being communicatively coupled to the system over a network connection, comprising:

a storage device;

one or more applications stored on the storage device;

configuration data stored on the storage device, the configuration data including settings and user data previously obtained from the information handling system;

application data stored on the storage device, the application data including data corresponding to the applications included on the information handling system, the application data further including an updated version of one of the applications included on the information handling system;

a software program capable of creating a data package based upon the configuration data and the application data stored on the storage device, formatting the data package into a software update format, and transmitting the data package over the network connection to the information handling system, the data package being suitable for restoring the information handling system;

wherein the software program is further capable of, based upon at least one of the application data and the configuration data stored on the storage device, producing a suggestion for at least one of an application to be installed on the information handling system, hardware for the information handling system, and a configuration setting for the information handling system; displaying the produced suggestion on the information handling system; receiving a response to the displayed suggestion; and further creating the data package based upon the response to the displayed suggestion; and wherein the software program is further capable of labeling the data package to indicate the information handling system for which the data package was created.

19. The system as described in claim 18, wherein the network connection includes at least one of: a local area network (LAN), a wide area network (WAN), the Internet, a Universal Serial Bus (USB) connection, and a Recommended Standard 232 (RS-232) connection.

20. The system as described in claim 18, wherein the software program is further capable of querying the information handling system whether each application included thereon is available on the storage device.

21. The system as described in claim 20, wherein if a respective application included on the information handling system is available on the storage device, the application data further includes an identifier indicating the respective application and enabling retrieval of the respective application from the storage device.

22. The system as described in claim 20, wherein if a respective application included on the information handling system is not available on the storage device, the application data further includes the respective application.

23. The system as described in claim 18, wherein the software program is further capable of verifying compatibility of the updated version of the application with hardware for the information handling system.

24. The system as described in claim 18, wherein the software program is further capable of verifying compatibility of the updated version of the application with the configuration data.

25. The system as described in claim 18, wherein the software program is further capable of verifying compatibility of the updated version of the application with another one of the applications included on the information handling system.

* * * * *